United States Patent [19]

Liebowitz

[11] Patent Number: 4,917,452

[45] Date of Patent: Apr. 17, 1990

[54] LIQUID CRYSTAL OPTICAL SWITCHING DEVICE

[75] Inventor: Marshall Liebowitz, Ridgefield, Conn.

[73] Assignee: UCE, Inc., Norwalk, Conn.

[21] Appl. No.: 341,434

[22] Filed: Apr. 21, 1989

[51] Int. Cl.[4] .......................... G02B 6/26; G02B 6/10; G02F 1/13

[52] U.S. Cl. .............................. 350/96.15; 350/96.14; 350/96.16; 350/355; 350/347 V; 350/347 E

[58] Field of Search ............... 350/96.13, 96.14, 96.15, 350/96.16, 96.20, 330, 337, 338, 347 V, 347 E, 374, 355, 356

[56] References Cited

U.S. PATENT DOCUMENTS

| | | | |
|---|---|---|---|
| 4,516,837 | 5/1985 | Soref et al. | 350/347 V |
| 4,720,172 | 1/1988 | Baker | 350/334 |
| 4,781,426 | 11/1988 | Baker | 350/96.16 |
| 4,784,470 | 11/1988 | Baker | 350/96.14 X |
| 4,790,633 | 12/1988 | Baker | 350/347 V |
| 4,792,212 | 12/1988 | Baker | 350/347 V |
| 4,828,362 | 5/1989 | Skinner et al. | 350/96.14 |
| 4,852,962 | 8/1989 | Nicia | 350/96.20 |

OTHER PUBLICATIONS

*SPIE*, vol. 176, Guided Wave Optical Systems & Devices II, (1979), p. 7.
*Applied Optics*, vol. 13, No. 8, Aug. 1974, p. 8.

*Primary Examiner*—Frank Gonzalez
*Assistant Examiner*—Brian M. Healy
*Attorney, Agent, or Firm*—Parmelee, Bollinger & Bramblett

[57] ABSTRACT

A pair of transparent trapezoidal prisms each having angled endfaces with the larger bases in juxtaposition with respect to each other forming an interface therebetween are provided with at least one optical input and output coupled to the angled endfaces of the prisms. Optical radiation is applied to the input and normal to the angled endface at an angle greater than the critical angle with respect to the interface between the prisms. A liquid crystal beam splitter is positioned in the interface for splitting the radiation between the prisms each of which has a liquid crystal optical shutter positioned in the respective prisms to receive optical radiation which has been transmitted or reflected from the beam splitter at an angle normal to the optical shutter. Each of the shutters is provided with a variable biasing voltage of a continuous nature which is selectively variable for controlling the radiation passing therethrough thereby forming a controllable optical switch.

10 Claims, 2 Drawing Sheets

10
12
14
15
16
17
20
22
23
24
25
26
27
29
30
32
32'
32"
34
36
38
40
42
44
46
48
50
52
54
56
58
60
62
2

LIQUID CRYSTAL OPTICAL SWITCHING DEVICE

FIELD OF INVENTION

This invention relates to liquid crystal optical switching devices, and more particularly to such optical switches having at least two back to back prisms with a liquid crystal interface therebetween each of which contain a liquid crystal and optical shutter which is so arranged that radiation is always supplied normal to the shutters with the shutters being controlled by a bias voltage.

BACKGROUND OF INVENTION

Technological change is rapidly taking place in the telecommunications field with the introduction of optical fibers which can carry larger quantities of information with a substantial reduction in physical size of the components involved which result in substantial cost reduction. In addition, optical fibers generate little radiation during signal transmission thereby having little or no impact on the environment in which they extend.

With the use of light transmission of the signals, optical switching is essential for controlling the transmitted signals. Mechanical switches have been widely employed but suffer certain disadvantages including moving parts which are subject to wear as well as high-operating voltages. Accordingly, liquid crystal switches having no moving parts have been developed which suffer the disadvantage of being expensive and difficult to mass produce. In addition, internal cross talk and signal loss due to light scattering and optical path inaccuracies limit the applicability of such switches for use in optical telecommunications systems.

SUMMARY OF THE INVENTION

Accordingly, it is an object of this invention to provide a new and improved liquid crystal optical switching device which is directed to overcoming the disadvantages of prior liquid crystal optical switching devices.

Another object of this invention is to provide a new and improved liquid crystal optical switching device which is easier to assemble, align and operate than similar known liquid crystal switching devices.

Another object of this invention is to provide a new and improved liquid crystal optical switching device which is more reliable and optically better in operation.

Still another object of this invention is to provide a new and improved liquid crystal optical switching device which significantly improves separation in multiple channel switching operations.

In carrying out this invention in one illustrative embodiment thereof, a pair of transparent trapezoidal prisms each having angled endfaces and having the larger bases thereof in juxtaposition with respect to each other forming an interface therebetween and at least one optical input and output are coupled to the angled endfaces at right angles forming a optical switch. Liquid crystal beam splitter means is positioned along portions of the interface for splitting the radiation between the prisms and each prism contains an optical shutter means to receive optical radiation which has been transmitted or reflected by the beam splitting means at an angle normal to the optical shutter means. Variable biasing means are provided for each of the optical shutters which apply a continuous bias on the optical shutter means with the bias being selectively variable for controlling the radiation exiting the optical shutter. In the preferred embodiment, the prisms are bonded together over a large area of the interface for simplifying assembly and reducing environmental effects on the operation of the optical switch.

BRIEF DESCRIPTION OF THE DRAWINGS

The invention, together with further objects, advantages, aspects and features thereof, will be more clearly understood from the following description taken in connection with the accompanying drawings.

DESCRIPTION OF THE PREFERRED EMBODIMENTS

Figures 1, 2:
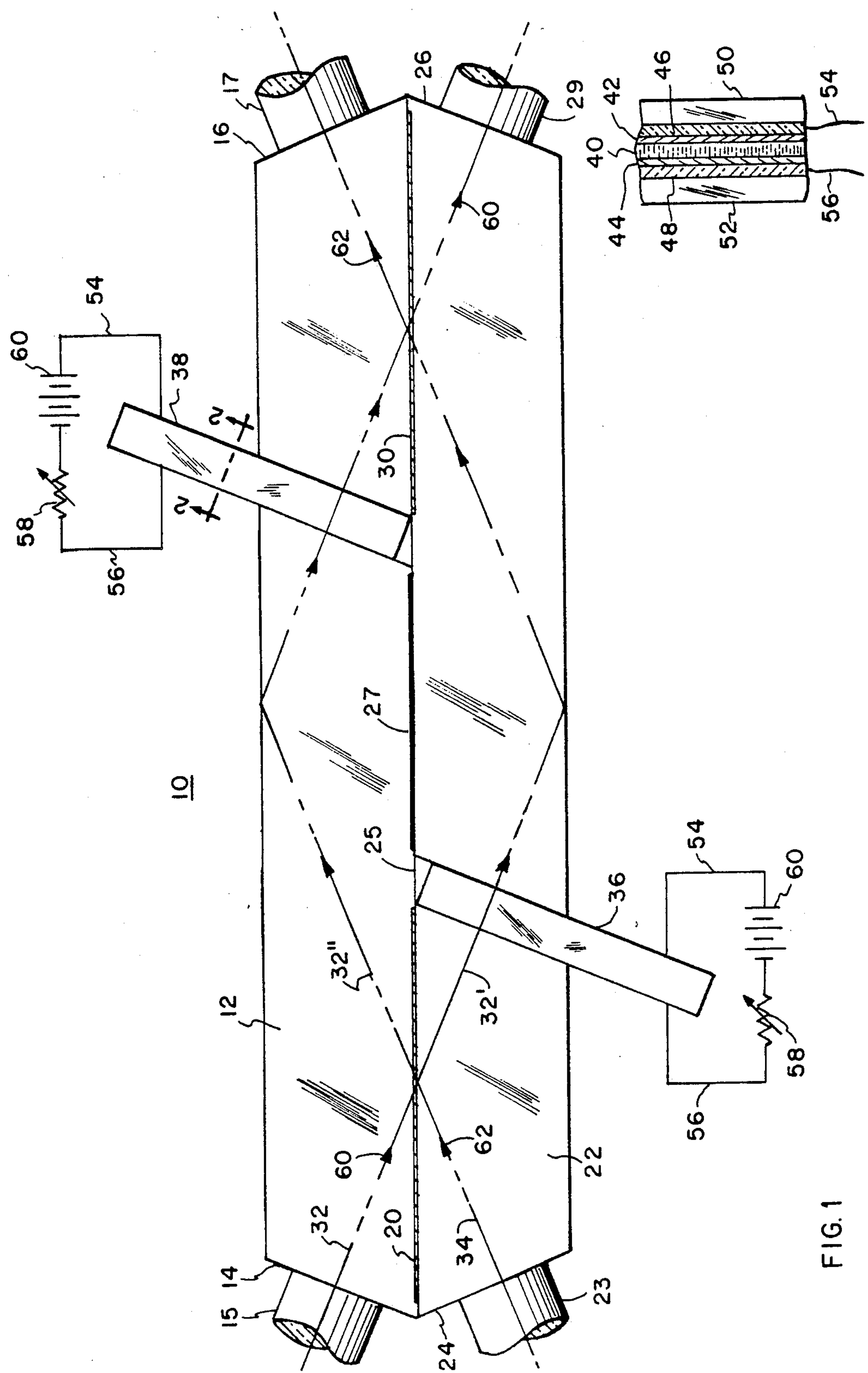
FIG. 1 is a front elevational view of a liquid crystal optical switch in accordance with a preferred embodiment of the present invention.
FIG. 2 is an enlarged, partial, cross-sectional view of the optical shutter utilized in the optical switch illustrated in FIG. 1.

Referring now to FIG. 1, a liquid crystal optical switch, referred to generally with reference numeral 10, includes first and second transparent trapezoidal prisms 12 and 22 having the larger bases thereon in juxtaposition forming an interface 25 therebetween which is bonded together in a large central area 27 which facilitates the assemblying and manufacture of the device 10. The first prism 12 has angled endfaces 14 and 16 thereon which have an input optical fiber 15 and an output fiber 17 respectively coupled thereto. The second prism 22 has angled endfaces 24 and 26 to which optical fibers 23 and 29 are respectively coupled. The input optical fibers 15 and 23 and the output optical fibers 17 and 29 are coupled to a flat cut of the endfaces 14, 24, 16 and 26 respectively, with the fibers being normal in alignment with their respective end faces. Accordingly, all optical radiations enter the prisms 12 and 22 or leave therefrom at an angle normal to the endfaces of the prisms.

Liquid crystal beam splitting means 20 and 30 are positioned along the interface 25 between the two prisms 12 and 22 on opposite sides of the large bonded area 27 such that any optical signals entering or leaving the switch 10 must either pass through or are absorbed or are reflected by the beam splitters 20 and 30. The liquid crystal beam splitters 20 and 30 are preferably in the form of ZLI 3497 which liquid crystal is preferably aligned to act as a beam splitter using a homeotropic alignment agent such as cetylpyridinium bromide monohydrate. The alignment agent is dissolved in the liquid crystal material forming homeotropically ordered molecules on the surface thereby providing a self-aligned liquid crystal beam splitter. Beam insertion for the switching device is then achieved by a applying optical radiation 32 and/or 34 through the optical fibers 15 and 23, respectively, at an angle greater than the critical angle 67° for the glass slab liquid crystal interface 25 on which the beam splitters 20 and 30 have been formed or placed. The beam 32 is split into two component polarizations on the beam splitter 20. The transverse electric polarization reflects a portion of the beam whereas the transverse magnetic polarization of the beam is transmitted. Since the beam 32 hits the interface, at slightly greater than the critical angle, the beam is totally internally reflected in the prisms 12 and 22 and moves down the prisms. The transmitted portion of beam 32' is applied to a liquid crystal optical shutter 36 while the reflected beam 32" is applied after reflection from the top of the prism 12 to another liquid crystal optical shutter 38. The optical rotaters or shutters 36 and 38 include a twisted nematic liquid crystal cell which in the absence of an applied field rotates the plane of light polarization 90°. When a predetermined voltage is applied to such cells, the polarization is reversed and the radiation 32' prime which has been reflected from the beam splitter 20 stays the same. Accordingly, by either applying or not applying a predetermined voltage to the twisted nematic liquid crystal rotators an optical switch is provided.

FIG. 2 illustrates a preferred form of the construction of the optical rotaters 36 and 38. The optical rotaters include a liquid crystal cell 40, preferably E 44, having anti-reflective coatings 42 and 44 thereon which coatings have a desired refractive index and are deposited by spin coating a solution preferably of titanium dioxide-silicone dioxide ($T_1O_2$—$S_1O_2$) which has a refractive index 1.8. The electrodes 46 and 48 which are transparent may consist of indium tin oxide which has a refractive index of 2. Since the refractive index of the liquid crystalline layer 40 is approximately 1.55 by matching the refractive indexes on the anit-reflection coatings 42 and 44 and on the transparent electrodes 46 and 48, the internal scattering losses of the switch 10 are reduced. The electrodes 48 and 50 along with the other internal layers of the rotaters 36 and 38 have glass covers 50 and 52.

Electrical leads 54 and 56 are connected to the transparent electrodes 46 and 48 of the rotaters 36 and 38 and are coupled to a variable resistor 58 and a power source 60. Accordingly, a bias voltage which is variable by the adjusting resistor 58 is applied to the rotaters 36 and 38 for placing a bias on the optical shutter rotaters 36 and 38 for controlling the path of the internal reflected light beam applied to the optical switch 10. It has been found that in order to increase the switching speed of the device 10 and to decrease cross-talk, a steady bias voltage which is less than the switching voltage, for example 1.2 volts, is maintained across the transparent electrodes 46 and 48. The control voltage to control switching will generally exceed four volts. When such a voltage is applied to the optical rotators 36 or 38, the light polarization stays the same and accordingly, the combination of the optical rotator and its associated liquid crystal beam splitter 20 or 30 will control whether the beam of internally reflected light as it moves down the optical switch 10 exits through fiber optic 17 or 29.

It should be noted that the optical switch 10 has a geometry that has bilateral symmetry and the optical switch 10 is thus bidirectional. Thus, although optical fibers 15 and 23 have been indicated to be inputs and optical fiber 17 and 29 have indicated tó be outputs, the situation could be completely reversed without a change in operation. In either instance also, the optical rotators are positioned in their respective prisms 12 and 22 such that any radiation applied to the switch will be perpendicular to the optical shutter regardless of whether the light radiation is transmitted by a beam splitter or reflected therefrom. The combination of the two fixed beam splitters and the two rotators determine the refractive index to either reflect off or go straight through, and accordingly determine the path of the light. In FIG. 1, the light beam 60 designated by a single arrow shows one path followed through the switch 10 when being applied from the optical fiber 15 and exiting optical fiber 29 while a second beam 62 designated with double arrowheads which is then applied from fiber optic 23 is shown exiting fiber optic 17. Simply by changing the bias voltage to rotate the plane of light polarization of either light beam 60 or 62 be directions of the exiting signals can be controlled.

The particular geometry having bilateral symmetry and the fact that a large area 27 may be utilized for bonding the two prisms 12 and 22 together facilitate the fabrication of the optical switches 10.

Figure 3:
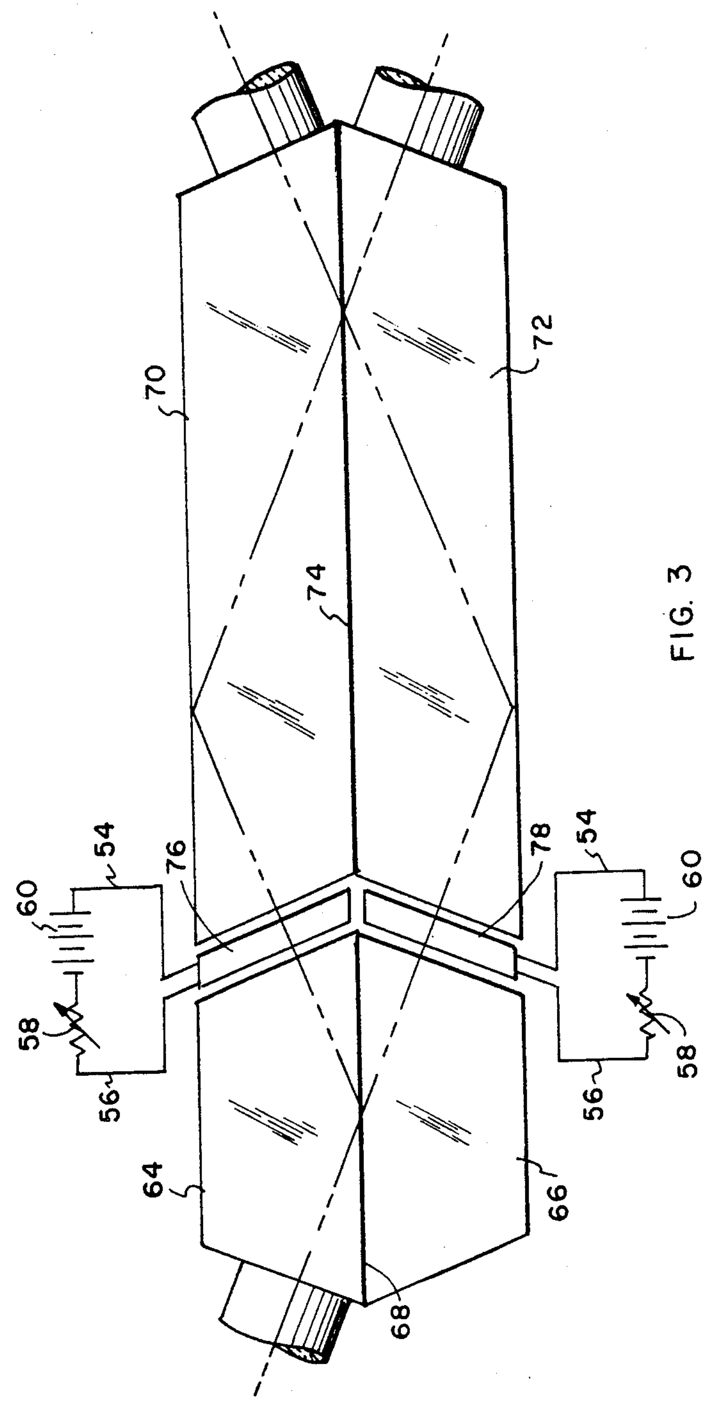
FIG. 3 is a front elevational view of another embodiment of the liquid crystal optical switch of the present invention.

FIG. 3 shows another embodiment which has two sets of prisms, two optical rotators and two beam splitters. Trapezoidal prisms 64 and 66 have a liquid crystal beam splitter 68 therebetween and parallelogram prisms 70 and 72 have a liquid crystal beam splitter interface 7 therebetween. The optical rotators 76 and 78 are positioned between the endfaces of prism 64 and 70 and 66 and 72, respectively. It should be noted that the same bilateral symmetry exists in this embodiment as it did with the embodiment shown in FIG. 1. In addition, all radiation enters the switching device at a 90° angle with the endfaces of the prisms of the device and also all radiation traveling within the optical switch impinges at a 90° angle with the optical rotators, which of course, is the same as the first embodiment and greatly reduces reflectivity losses. The difference in this embodiment is the fact that there is no wide area of bonding and the switching device must be bonded together with a peripheral seal which when exposed to changes in ambient environments undergo significant stresses which tend to limit the life of the device. In this regard, the embodiment of FIG. 1 offers greater mechanical stability and the external environment thereto has less affect on the operation of the device. The particular geometry of both embodiments provide less cross-talk between switching channels and thus perform a more reliable, efficient and quicker switching operation with less loss of signal.

The disclosed liquid crystal optical switch can be modified by replacing the liquid crystal twisted nematic optical rotator cells with electrically controlled birefringent (ECB) cells. One type of ECB cell is known as a Pi cell which can be switched at video speeds and can be used to switch between two color frequencies. Accordingly, the ECB cell switch can be used to transmit a selected wavelength while blocking another unselected wavelength. Being able to switch at video speeds and beyond is due to the switching speed capability of the ECB cells. Accordingly, an optical switch of this type can multiplex signals by selectively inserting, separating and transmitting information within the same optical fiber at the same time and in the same or different directions between transmitters and receivers.

The ECB cell type of shutter system can be designed as a display device using no external polorizers or neutral density or color filters which absorb up to 50% of the light applied thereto. Thus, the color switch employing ECB cells will pass virtually all of the light which is not absorbed in the liquid crystal or glass prisms.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. In a liquid crystal optical switching device having first and second transparent trapezoidal prisms each having angled end faces and having the larger of the bases in juxtaposition with respect to each other forming an interface therebetween, at least one optical radiation input and output coupled to said angled end faces of said prisms, the improvement comprising:

means for applying optical radiation to said input normal to said angled end face and at an angle greater than the critical angle with respect to said interface;

a liquid crystal optical shutter means positioned in lateral spaced relationship along said interface in each of said prisms;

means for bonding said prisms centrally along said interface between said liquid crystal optical shutter means;

liquid crystal beam splitter means positioned in said interface and extending from said means for bonding said prisms between said optical shutters and said angled end faces of said prisms whereby optical radiation applied to said angled end faces of said prisms which is transmitted or reflected by said beam splitters is applied to said shutter means at an angle normal to said optical shutter means; and variable biasing means coupled to said optical shutter means for applying a continuous bias on said optical shutter means which bias is selectively variable for controlling the optical radiation switched by said switching device.

2. The optical switching device as claimed in claim 1 in which said liquid crystal optical shutter means comprises a twisted nematic cell.

3. The optical switching device as claimed in claim 2 wherein said twisted nematic cell has anti-reflection coatings thereon and transparent electrodes to which said biasing means is coupled.

4. In a liquid crystal optical switching device having first and second transparent trapezoidal prisms each having angled end faces and having the larger of the bases in juxtaposition with respect to each other forming an interface therebetween, at least one optical input and output coupled to said angled end faces of said prisms, the improvement comprising:

means for applying optical radiation to said input normal to said angled end face and at an angle greater than the critical angle with respect to said interface;

liquid crystal beam splitter means positioned in said interface for splitting said radiation between said prisms;

liquid crystal optical shutter means comprising a twisted nematic cell positioned in each of said prisms to receive optical radiation which has been transmitted or reflected by said beam splitting means at an angle normal to said optical shutter means;

variable biasing means coupled to said optical shutter means for applying a continuous bias on said optical shutter means which bias is selectively variable for controlling the optical radiation switched by said switching device;

said twisted nematic cell has anti-reflection coatings thereon and transparent electrodes to which said biasing means is coupled; and said anti-reflection coatings are SiO2—TiO2 and said transparent electrodes comprise indium tin oxide.

5. The optical switching device as claimed in claim 1 wherein said liquid crystal optical shutters means are electrically controlled birefringent (ECB) cells.

6. The optical switching device as claimed in claim 5 wherein said ECB cells are Pi cells.

7. The optical switching device as claimed in claim 6 which are switched at video speeds.

8. The liquid crystal optical switching device as claimed in claim 5 wherein said ECB cells have signals applied therein which are multiplexed by said ECB cells.

9. The optical switching device as claimed in claim 1 wherein said liquid crystal beam splitter is self-aligned using a homeotropic alignment agent in the liquid crystal beam splitter.

10. The optical switching device as claimed in claim 9 wherein said alignment agent is cetylpyridinium bromide monohydrate.

* * * * *